Oct. 18, 1966 D. VON SANDEN ETAL 3,280,262

TIME-DIVISION MULTIPLEX TELEPHONE SYSTEM

Filed March 29, 1963 2 Sheets-Sheet 1

United States Patent Office 3,280,262

Patented Oct. 18, 1966

3,280,262

TIME-DIVISION MULTIPLEX TELEPHONE SYSTEM

Dieter Von Sanden, Munich-Solln, and Max Schlichte, Munich, Germany, assignors to Siemens Halske Aktiengesellschaft, Berlin and Munich, Germany, a corporation of Germany Filed Mar. 29, 1963, Ser. No. 269,204

Claims priority, application Germany, Apr. 2, 1962, S 78,785

4 Claims. (Cl. 179—15)

Figure 1:
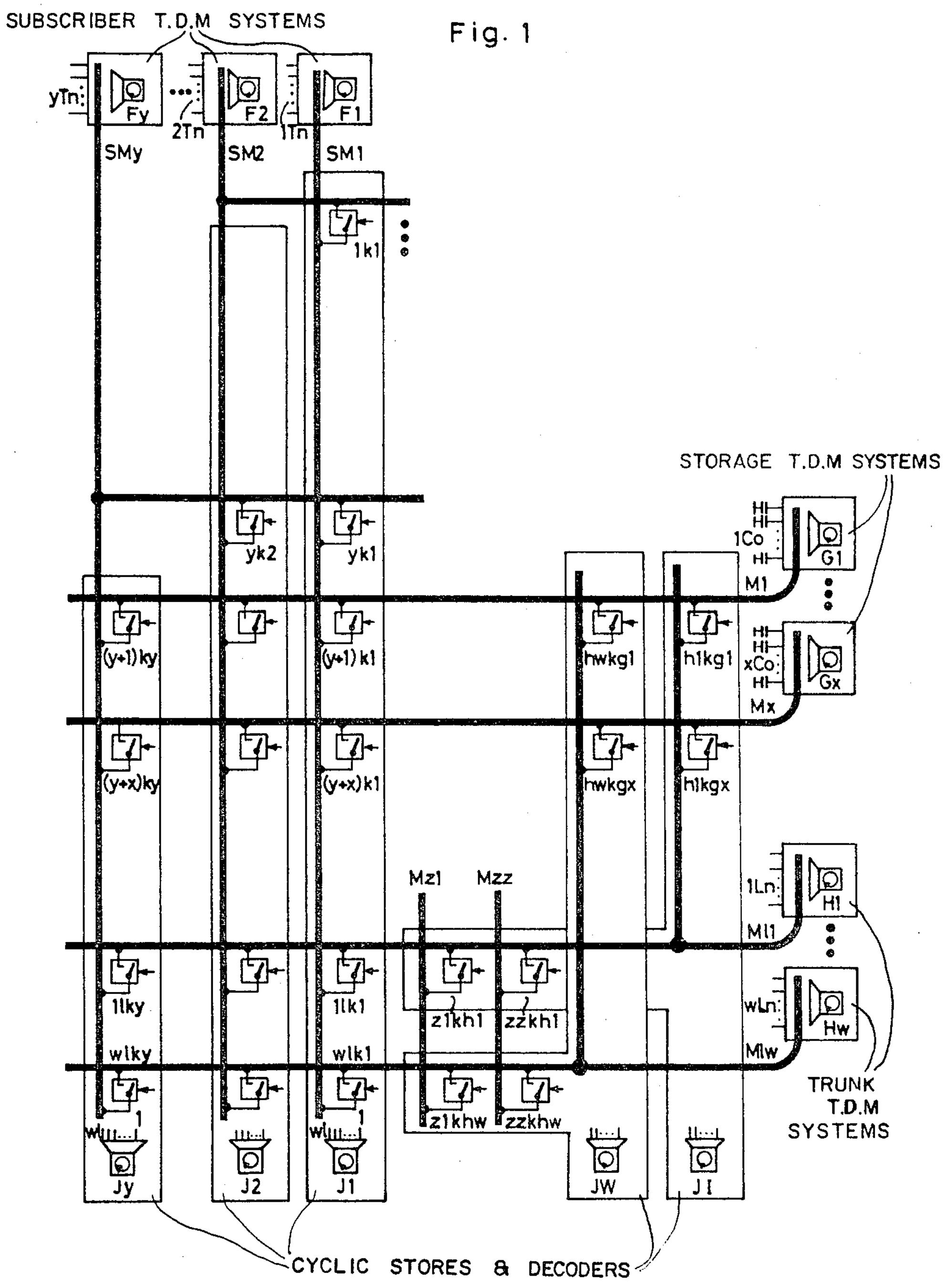

The invention disclosed herein relates to time-division telephone systems and is particularly concerned with improvements applicable to a system of this type as disclosed in copending application Serial No. 205,402, filed June 26, 1962, which is owned by the assignee also named in the present case.

The copending application relates to a switching or circuit arrangement over which is conducted the traffic of a plurality of time-division multiplex telephone communication systems, each of which comprises a telephone multiplex line common for outgoing and incoming traffic, to which the subscribers of the time-division multiplex telephone communication system in question are connected periodically in impulse-like fashion by means of speech or call switches. This switching or circuit arrangement is constructed as coupler which, however, has, per combination pair of telephone multiplex lines, a coupling point contact so that over said coupling point contacts traffic can be handled between different time-division multiplex telephone communication systems, specifically by pulse-wise closing of the coupling point contact which is connected to the telephone multiplex lines entering into consideration as well as coupling point contacts per combination pair of a telephone multiplex line and a multiplex line of special time-division multiplex communication systems which instead of subscribers have speech energy storers which can be connected twice per cycle to its multiplex line so that traffic within the time-division multiplex telephone communication system is also possible, so that in all of these cases of operation at all times only one speech or call switch need be actuated at the same time, since the speech energy storers bridge in known manner over the time intervals between the times of the closing of the speech switches associated with the subscribers to be connected for the exchange of energy therebetween. In the copending application, there has already been indicated a supplementing of the switching arrangement, as a result of which the coupler has additional coupling point contacts which belong to combination pairs of multiplex lines which are formed in each case of a telephone multiplex line and of a multiplex line of special time-division multiplex communication systems to which there are connected, instead of subscribers, lines leading to other exchanges or the like, for outgoing and/or incoming traffic, for the handling of which such additional coupling point contacts are in each case closed in a pulse-like manner. After such a supplementing of the switching arrangement described in the copending application, not only can traffic be carried out in and between the individual time-division multiplex telephone communication systems of a central exchange, but traffic can also be carried out between the subscribers of the individual time-division multiplex telephone communication systems of the exchange in question and other exchanges over lines connected with them. In this manner, normally all desired connections in and between different exchanges can be made.

It may, however, in addition to this, be advisable to have still further possibilities of connection so that lines which are connected to a special time-division multiplex communication system of one exchange and lead to other exchanges or the like can be connected, not only with subscribers of a time-division multiplex telephone communication system of the central exchange in question, but also with other such lines which lead to other exchanges or the like, and which also are connected to a special time-division multiplex communication system of the exchange in question. This can, for instance, be the case when all regular connecting paths between two outside exchanges are occupied, while idle lines still extend from the two outside exchanges to the exchanges containing the switching arrangement described in the copending application. In such a case, the invention described below makes it possible to establish, via said exchange, i.e., via its coupling switching arrangement, over which the traffic of the time-division multiplex telephone communication systems of the central exchange is conducted in indirect connection between the two outside exchanges.

The invention thus relates to a switching arrangement over which the traffic of a plurality of time-division multiplex telephone communication systems each having a telephone multiplex line to which the subscribers of the corresponding time-division multiplex telephone communication system are connected in pulse-wise manner periodically by means of speech or call switches is conducted, which switching arrangement is constructed in accordance with the copending application as coupler which has coupling point contacts associated in each case with a combination pair of telephone multiplex lines of such communication systems for conducting the traffic between various ones of such time-division multiplex telephone communication systems and, associated in each case with a combination pair consisting of one telephone multiplex line and one multiplex line of special time-division multiplex communication systems which have speech energy storers instead of subscribers, coupling point contacts for conducting the traffic within the individual time-division multiplex telephone communication systems, and furthermore coupling point contacts which are associated in each case with a combination pair of one of the said telephone multiplex lines and a multiplex line of additional time-division multiplex systems having lines leading to other central exchanges or the like, instead of subscribers. This switching arrangement is characterized by the fact that the coupler has in addition both coupling point contacts which are connected in each case with their one terminal to a special multiplex line and with their other terminal to one of the multiplex lines of the additional time-division multiplex communication systems having lines leading to other exchanges, over which coupling point contacts, traffic can be conducted between said additional time-division multiplex communication systems and specifically in each case by pulse-wise closing of such coupling point contacts connected to a special multiplex line and to the multiplex lines of the corresponding time-division multiplex communication systems, as well as coupling point contacts which in each case consist of a multiplex line of such an additional time-division multiplex communication system having lines leading to other central offices instead of subscribers, and a multiplex line of one of the other time-division multiplex communication systems having speech energy storers instead of subscribers, via which coupling point contacts, traffic can be conducted within the additional time-division multiplex communication systems having lines leading to other exchanges for outgoing and incoming traffic.

The switching arrangement in accordance with the invention is advantageous, particularly in cases in which there is provided in one central exchange a large number of time-division multiplex communication systems to which trunk lines leading to other exchanges or the like for outgoing and incoming traffic are connected instead of subscribers and where possibilities of connection between said communication systems are required, but the traffic between said time-division multiplex communication systems is relatively slight. In order to effect this traffic between the time-division multiplex communication systems having trunk lines leading to other exchanges instead of to subscribers, there then is required in the case of the switching arangement of the invention only a relatively small number of coupling points, since connections in each case between two such time-division multiplex communication systems of any desired combination can be conducted over a special multiplex line provided in the switching arangement of the invention, and therefore it is not necessary to use a larger number of special multiplex lines than are required to handle this traffic between the time-division multiplex communication system having trunk lines leading to other exchanges or the like, instead of to subscribers.

The invention will now be explained in further detail with reference to the drawings.

FIG. 1 shows essential parts of the arrangement also shown in FIG. 3 of the copending application and parts modified in accordance with the present invention; and FIGS. 2*a* to 2*d* show different arrangements of coupling point contacts.

FIG. 1 shows again essential parts of the switching arrangement shown in FIG. 3 of the copending application so that the fundamental construction of this switching arrangement can be noted herefrom. This switching arrangement, which is constructed as a cross wire coupling field, briefly referred to as a coupler, has the coupling point contacts 1*k*1 . . . *yk*1 . . . . These coupling point contacts are connected in each case to two of the telephone multiplex lines SM1 . . . SM*y* of the time-division multiplex telephone communication systems F1 . . . F*y*, so that one such coupling point contact is associated with each combination pair of telephone multiplex lines. The traffic between subscribers 1T*n* . . . *y*T*n* of different such systems F1 . . . F*y* is conducted over said coupling point contacts 1*k*1 . . . *yk*1 . . . . The coupler furthermore has coupling point contacts $(y+1)k1$ . . . $(y+x)ky$ which by connection to corresponding multiplex lines are associated in each case with a combination pair consisting of a telephone multiplex line SM1 . . . SM*y* and a multiplex line M1 . . . M*x* of other time-division multiplex communication systems G1 . . . G*x* which have speech energy storers instead of subscribers; these coupling point contacts serve for handling the traffic within the individual systems F1 . . . F*y*. Finally, the coupler has additional coupling point contacts 1*lk*1 . . . *wlky*, which by connection to corresponding multiplex lines are associated in each case with a combination pair consisting of a multiplex line SM1 . . . SM*y* of the systems F1 . . . F*y* and of a multiplex line M*l*1 . . . M*lw* of additional systems H1 . . . H*w* having trunk lines 1L*n* . . . *w*L*n* leading to other exchangers or the like; these latter coupling contacts serve for traffic between the subscribers 1T*n* . . . *y*T*n* of the exchange to which the coupler belongs and the trunk lines 1L*n* . . . *w*L*n* leading to other exchanges. The individual switching parts are designated in FIG. 1 in accordance with the designations used in the copending application, and it is therefore deemed unnecessary to explain these parts in further detail since the copending application may be referred to for this purpose.

In accordance with the invention, the coupler also has additional coupling point contacts such as the coupling point contacts *zlkhl* . . . *zzkhw*, which are connected in each case with their one terminal to a special multiplex line such as Mz1 or M*zz*, and with their other terminal to one of the multiplex lines M*l*1 . . . M*lw* of the additional time-division multiplex communication systems H1 . . . H*w*. The special multiplex lines Mz1 and M*zz* therefore cross the multiplex lines M*l*1 . . . M*lw* of the additional systems H1 . . . H*w* having trunk lines leading to other exchanges or the like, the coupling point contacts *zlkhl* . . . *zzkhw* being disposed at the corresponding crossing points for effecting connections between the two crossing multiplex lines. Furthermore, additional coupling point contacts like the coupling point contacts *hlkgl* . . . *hwkgx*, are connected in each case to a multiplex line M*l*1 . . . M*lw* of one of the additional time-division multiplex communication systems H1 . . . H*w* (having lines 1L*n* . . . *w*L*n* leading to other exchangers or the like instead of subscribers) and to a multiplex line M1 . . . M*x* of one of the additional time-division multiplex-communication systems G1 . . . G*x* (having speech energy storers 1C*o* . . . *x*CO instead of subscribers). A coupling point contact *hlkgl* . . . *hwkgx* is in this manner associated with each combination pair of one multiplex line having lines leading to other exchanges or the like, and of a multiplex line having speech energy storers.

The handling of the traffic in and between the additional time-division multiplex communication systems H1 . . . H*w* having lines leading to other central exchanges or the like is effected in the following manner:

If for example a connection is to be made between a line of the line group 1L*n* of the communication system H1 and a line of the line group *w*L*n* of the communication system H*w*, the speech switch—already referred to in the copending application—of the corresponding line is closed periodically in pulse-like fashion in the system H1 so that said line is periodically connected with the multiplex line M*l*1. The control pulse causing this manner of closing has a specific phase relationship which differs from the phase relationships of control pulses associated with other lines of the same system H1. Synchronously with the actuation of the speech switch associated with the said line, a coupling point contact leading to a special multiplex line is now likewise periodically closed in impulse-like fashion, for instance the coupling point contact *zzkhl* leading to the special multiplex line M*zz*. At the same pulse phase, the coupling point contact *zzkhw* is also closed, which contact leads from said special multiplex line M*zz* to the multiplex line M*lw* of the additional time-division multiplex communication system H*w* to which the other line of line group *w*L*n* belonging to the connection in question belongs. In this way, there is obtained a pulse-wise connection between the multiplex line M*l*1 of the time-division multiplex communication system H1 and the multiplex line *m*L*w* of the time-division multiplex communication system H*w*. The desired telephone connection is produced by the fact that in the cyclic storer—already described in the copending application—of the system H*w*, the address of the desired line of the line group *w*L*n* is being cycled, doing so in such a manner that the resultant control pulse for the speaking key leading to this second line in the system H*w* has the same phase relationship as the control pulse which controls the speech switch associated with the first line in the system H1. In order to maintain this connection, therefore, only one cycling storer is necessary in each of the systems concerned.

Between two of the additional time-division multiplex communication systems H1 . . . H*w* there can, of course, simultaneously exist a plurality of telephone connections. The corresponding control pulses must then, however, have different phase relationships. These telephone connections can then even be conducted over the same special multiplex line Mz without interfering with each other. Lines which belong to other pairs of additional time-division multiplex communication systems H can then also be connected to each other via the same special multiplex line, provided that control pulses of different phase relationship are used. If, as indicated in FIG. 1, a plurality of special multiplex lines are provided for the telephone traffic between the additional time-division multiplex communication systems H1 . . . H*w*, there may even simultaneously exist telephone connections which are maintained by means of control pulses of the same phase relationship. It is then merely necessary to satisfy the condition that they are conducted over different special multiplex lines Mz1 . . . Mzz. Since in each time-division multiplex communication system H having trunk lines L*n* leading to other exchanges, only one cyclic storer is provided, disturbances due to use of the same multiplex line M1 cannot occur; they are excluded by the fact that only one control pulse can be supplied by a cyclic storer for a given phase relationship.

The traffic between trunk lines of one and the same time-division multiplex communication system H1 . . . H*w* can also be handled by means of the cyclic storer provided in each case in such a communication system. The systems G1 . . . G*x*, which can be reached via the coupling point contacts *hlkgl* . . . *hwkgx*, and which have speech energy storers 1C*o* . . . *x*C*o* instead of subscribers, are similarly used. For one and the same telephone connection, there are required in this case two control pulses of different phase relationship. If, for instance, two trunk lines of the time-division multiplex communication system H*w* are to be connected with each other, the addresses of these two trunk lines of the line group *w*L*n* will be cycled, staggered with respect to each other, in the corresponding cyclic storer. Both connecting lines are therefore connected periodically in pulse-like manner, but at different times, via the corresponding speech switch with the multiplex line M*lw*. In order to produce the desired connection, for example, the coupling point contact *hwkgl* is closed pulse-wise at the two instants so that the multiplex line M*lw* is connected with the multiplex line M1 of the system G1. In the cyclic storer of the system G1, the address of one and the same speech energy storer must then cycle twice and specifically in such a manner that for the closing of the corresponding speech switch, there are supplied two control pulses which are of the same phase as the control pulses supplied for this connection in the time-division multiplex communication system. The speech energy storer used, now, in the manner described already in the corresponding application, bridges over the time intervals which lie in each case between two closings of the speech switches associated with the corresponding trunk lines of the line group *w*L*n* in the system H*w*, so that the intended connection is produced between the two trunk lines.

Furthermore, other pairs of trunk lines of the same line group *w*L*n* of the system H1 can be connected simultaneously with each other without interference by means of other speech energy storers of the system G1, since other control pulses are necessarily used for this purpose. If other pairs of control pulses are used, pairs of trunk lines belonging to other time-division multiplex communication systems (for instance H1) can also be connected with each other, and as a matter of fact even if speech energy storers belonging to the time-division multiplex communication system G1 are used for this purpose. These calls are naturally conducted over other coupling point contacts, for instance over the coupling point contact *hlkgl*. Since still further time-division multiplex communication systems having speech energy storers instead of subscribers are connected to the coupling switching arrangement shown in FIG. 1, such as the time-division multiplex communication system G*x*, it is even possible to connect together trunk lines, the speech switches of which are controlled by means of control pulses which have the same phase relationship as those which are already used for another connection. These telephone connections, however, are to be conducted over other multiplex lines so as to avoid mutual interference therebetween. This results automatically, since the same pair of control pulses can be supplied by one cyclic storer in one and the same time-division multiplex communication system provided with speech energy storers.

Via the switching arrangement shown in FIG. 1, connections between two trunk lines of different time-division multiplex communication systems H1. . . H*w* can also be made when the speech switches associated with the trunk lines participating in the connection cannot be operated synchronously, since no common idle pulse relationship is any longer available. In such a case, similar to what has just been described for a connection between trunk lines of one and the same time-division multiplex communication systems H1 . . . H*w*, there are used speech energy storers which bridge over the time intervals which lie in each case between the closings of the two speech switches in the two corresponding systems. In this connection, for example, at the one closing time at which the trunk line, participating in the connection in question, from the line group 1L*n* of the system H1 is connected to its multiplex line M*l*1, the coupling point contact *hlkgl* is at the same time actuated, as well as a speech switch in the system G1, whereby a speech energy storer is connected to the multiplex line M1; the same speech switch in the system G1 is also closed at the other closing time, at which the trunk line, participating in the connection in question, of the system H*w* is connected to its multiplex bar M*lw*, whereby the coupling point contact *hwkgl* is now actuated.

Some information will now be given as to how the coupling point contacts of the coupler which are additionally provided in the switching arrangement in accordance with the invention can be actuated.

The coupling point contacts can be actuated with the same means as provided, in the manner already described in the copending application, for actuation of the speech switches in the individual systems. Thus, for example, special cyclic storers can be provided in which are cycled, as addresses, code signals associated with the coupling point contacts and which serve to produce control pulses. These control pulses then effect a periodic pulse-wise closing of the corresponding coupling point contacts. Such cyclic storers can for instance be associated in each case with coupling point contacts connected to a multiplex line M1. In this manner, in the switching arrangement shown in FIG. 1 there are associated with the coupling point contacts devices which are designated by J1 . . . JW and which in each case contain a cyclic storer with a decoder and other parts, not shown. The cyclic storer with decoder belonging to the device JW has for instance as many outputs as there are additional coupling point contacts connected in accordance with the invention to the speech multiplex line M*lw*. Over these outputs are actuated these coupling point contacts of the multiplex line M*lw*, and therefore also the coupling point contacts *zlkhw* . . . *zzkhw* and *hwkgl* . . . *hwkgx*. It is therefore not necessary to actuate simultaneously more than one coupling point contact connected to a multiplex line of one of the additional systems H1 . . . H*w* having trunk lines leading to other central exchanges or the like, since in such case different telephone connections would be connected together; therefore, for the actuation of the additional coupling point contacts connected to a given multiplex line M*l*1 . . . M*lw*, one cyclic storer is sufficient in each case. Coupling point contacts connected to a special multiplex line Mz1 . . . Mzz are only actuated simultaneously when they belong to the same telephone connection.

It may also be mentioned that the coupling point contacts which are contained in the switching arrangement shown in FIG. 1, of course do not need in each case to consist of a simple mechanical or electronic contact but can be developed, depending on the type of technique employed, as two-wire or four-wire contacts. In this connection, in case of a four-wire development of the coupling point contacts, it is necessary of course to comply with the condition that in the connections conducted over such coupling point contacts in each case between two time-division multiplex communication systems, each having a four-wire multiplex line, the speech multiplex line of the one time-division multiplex communication system is connected with the receiving or listening multiplex line of the other time-division multiplex communication system and, conversely, the speech multiplex line of the other time-division multiplex communication system is connected with the receiving or listening multiplex line of the first time-division multiplex communication system. This will be explained briefly with reference to FIGS. 2*a* to 2*d* in which different possibilities for the development of the coupling point contacts are shown in a single-wire representation.

Figure 2A:
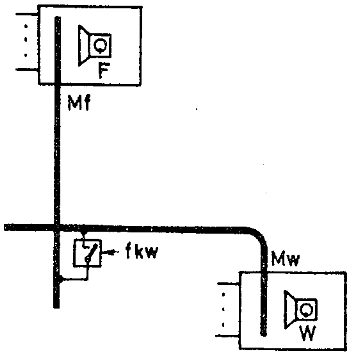

In FIG. 2*a* there is shown a two-wire coupling point contact *fkw* which connects together two crossing two-wire multiplex lines M*f* and M*w* of two time-division multiplex communication systems F and W having connecting lines leading to subscribers or trunk lines leading to other central exchanges or the like.

Figure 2B:
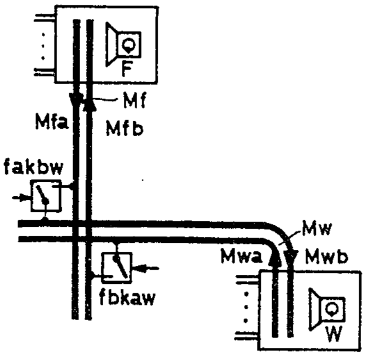

Accordingly, if there are concerned two crossing four-wire multiplex lines of two such systems, the coupling point will be developed in accordance with FIG. 2*b*. At the crossing point of the two four-wire multiplex lines, there is provided here a duo-group of coupling point contacts *fakbw* and *fbkaw*, of which the coupling point contact *fakbw* connects the speech multiplex line M*fa* of the system F with the receiving multiplex line M*wb* of the system W and the coupling point *fbkaw* connects the speech multiplex line M*wa* of the system W with the receiving multiplex line M*fb* of the system F.

Figure 2C:
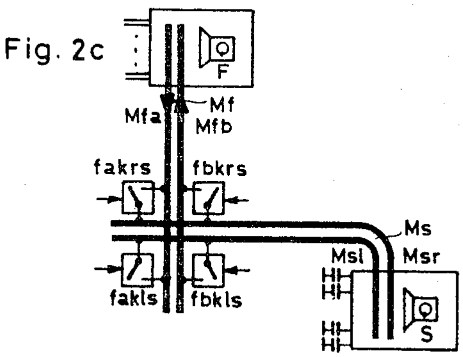

If the four-wire multiplex line M*f* of a time-division multiplex communication system F having lines leading to subscribers or other central offices or the like, and the four-wire multiplex line M*s* of a system S, which has speech energy storers instead of subscribers, which are connected two times per scanning period to their multiplex line M*s* cross each other, then the coupling point, in accordance with FIG. 2*c*, has a quad group of contacts *fakls, fbkrs, fakrs,* one of which of the two said times, is closed at the pair of coupling point contacts lying along a diagonal and at the other of the said times at the other diagonally lying pair of contacts. In this way, once again the result is obtained that the speech energy transmitted at the one time from the one subscriber of the system F over the speech multiplex line M*fa* and for instance the coupling point contact *fakls* to the speech energy storer of a pair of speech energy storers which is connected to the one line M*s*1 is transmitted at the other time from said speech energy storer, again connected to the one line M*s*1, over the coupling point contact *fbkls* and the receiving multiplex line M*fb* to the other subscriber of this connection within the system F, and vice versa.

Figure 2D:
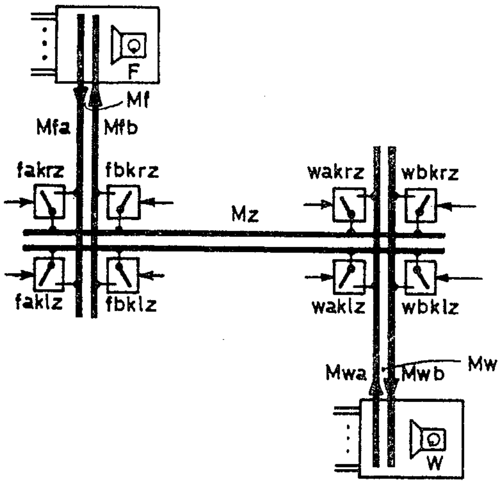

In similar manner, a coupling point has a quad group of contacts when the four-wire multiplex lines M*f* and M*w* of the time-division multiplex communication systems F and W which are to be connected to each other do not cross each other, but rather the connections are made via a special four-wire multiplex line Mz which crosses the two four-wire multiplex lines M*f* and M*w* which are to be connected together. Such coupling points are shown in FIG. 2*d*. In such event, upon making a connection, in each case two diagonally opposite contacts at the two coupling points entering into question are closed, in which connection at the one coupling point, the two coupling point contacts lying on the one diagonal, for instance, the coupling point contacts *fakrz* and *fbklz,* while at the other coupling point, the two coupling point contacts lying on the other diagonal, for instance the coupling point contacts *wbkrz* and *waklz,* are closed, whereby the speech multiplex line M*fa* of the one system F is connected with the receiving multiplex line M*wb* of the other system W, and, conversely, the speech multiplex line M*wa* of said other system W is connected with the receiving multiplex line M*fg* of the first system F.

Changes may be made within the scope and spirit of the appended claims which define what is believed to be new and desired to have protected by Letters Patent.

We claim:

1. In a switching arrangement over which is conducted the traffic of a plurality of time-division multiplex telephone communication systems, each having a telephone multiplex line to which the subscribers of the corresponding systems are periodically connected in pulse-wise fashion in each case by means of speech switches, said arrangement being constructed as a cross wire coupling field which has, in addition to coupling point contacts for carrying the traffic between different such time-division multiplex telephone communication systems, which coupling point contacts are associated in each case with a combination pair of telephone multiplex lines of said communication systems and coupling point contacts for carrying out traffic within the individual time-division multiplex telephone communication systems which coupling point contacts are associated in each case with a multiplex line of additional time-division multiplex communication systems which have speech energy storers instead of subscribers, also additional coupling point contacts which in each case are associated with a combination pair of a telephone multiplex line and a multiplex line of additional time-division multiplex telephone communication systems having lines leading to other central exchanges rather than subscribers; the improvement which comprises, disposed in the coupling field, additional coupling point contacts which in each case are connected with their one terminal to a special multiplex line and with their other terminal to one of the multiplex lines of the additional time-division multiplex communication systems having lines leading to other exchanges, over which additional coupling point contacts can be carried the traffic between said additional time-division multiplex telephone communication systems, and specifically in each case by pulse-wise closure of such additional coupling point contacts, as well as coupling point contacts which belong to combination pairs of multiplex lines which in each case consist of a multiplex line of such additional time-division multiplex communication system having lines leading to other exchanges and a multiplex line of one of the additional time-division multiplex communication systems having speech energy storers instead of subscribers, via which coupling point contacts the traffic can be carried within the additional time-division multiplex communication systems having lines for outgoing and incoming traffic which lead to other central exchanges.

2. A switching arrangement according to claim 1, wherein coupling point contacts connected to the same multiplex line of a time division multiplex communication system are actuated by means of code signals which serve as addresses and are periodically cycled in a cyclic storer.

3. A switching arrangement according to claim 2, wherein different coupling point contacts which are connected to the same multiplex line of a time-division multiplex communication system are not simultaneously actuated.

4. A switching arrangement according to claim 2, wherein coupling point contacts which are connected to the same special multiplex line and which are furthermore connected to different multiplex lines of time-division multiplex communication systems are simultaneously closed only when they belong to the same telephone connection.

References Cited by the Examiner

UNITED STATES PATENTS 3,204,033 8/1965 Adelaar ______________ 179—15

DAVID G. REDINBAUGH, *Primary Examiner.*

R. L. GRIFFIN, *Assistant Examiner.*